United States Patent
Westbrook

[15] 3,659,619
[45] May 2, 1972

[54] GREEN PEA SHELLER

[72] Inventor: Charles L. Westbrook, 715 Washington Avenue, Ayden, N.C. 28513

[22] Filed: Jan. 28, 1971

[21] Appl. No.: 110,737

Related U.S. Application Data

[63] Continuation-in-part of Ser. No. 836,759, June 26, 1969, abandoned.

[52] U.S. Cl. ........................................................130/30 R
[51] Int. Cl. ..................................................................A01d
[58] Field of Search........................130/30 R, 30 G; 146/203

[56] References Cited

UNITED STATES PATENTS

| | | | |
|---|---|---|---|
| 2,277,777 | 3/1942 | Ponto | 130/30 |
| 2,807,267 | 9/1957 | Walker | 130/30 |
| 2,808,836 | 10/1957 | McManus | 130/30 |
| 3,120,232 | 2/1964 | Rogers | 130/30 |

Primary Examiner—Antonio F. Guida
Attorney—John A. Mawhinney

[57] ABSTRACT

A pair of opposing pea pod aligning members supported for relative movement toward and away from each other and biased toward minimum spaced positions. One of the aligning members includes an adjustably retained cutter blade projecting outwardly therefrom toward the opposing member for slitting a pea pod advanced longitudinally between the members, and a curved tapered tongue is supported in position for spreading the split pod and raking the peas from within the pod.

10 Claims, 5 Drawing Figures

Patented May 2, 1972

3,659,619

INVENTOR.
CHARLES L. WESTBROOK
BY
John A. Mawhinney
ATTORNEY

GREEN PEA SHELLER

This application is a continuation-in-part of application Ser. No. 836,759, filed June 26, 1969, and now abandoned.

There are presently on the market large expensive machines operable to shell green peas. While these machines are economical to use in the kitchens of large hotels, restaurants and dining halls where large numbers of persons eat, their initial expense renders them uneconomical for use in kitchens which prepare only modest amounts of food. Accordingly, when fresh peas are to be prepared in kitchens where only modest amounts of food are cooked, one or more persons of the kitchen staff must hand-shell the peas which are to be cooked. This hand-shelling operation consumes considerable man hours of labor over a period of time during which fresh peas may be prepared and accordingly, there is a need for an apparatus by which the hand-shelling of peas may be greatly accelerated.

It is therefore the main object of this invention to provide a relatively inexpensive apparatus into which pea pods may be longitudinally advanced and which will be capable of centering the pods to assure slitting of the pods whereby the peas can be stripped therefrom as fast as a person can hand-feed pea pods into the sheller.

Another object of this invention, in accordance with the immediately preceding object, is to provide a green pea sheller in accordance with the preceding object and including means by which the sheller will automatically adjust itself to perform the shelling operation on pea pods of different sizes.

A still further object of this invention is to provide a green pea sheller which may be readily attached to a bucket rim and which will be operative to direct the shelled peas downwardly into the bucket as each pea pod is advanced through the sheller.

Another object of this invention is to provide a pea sheller including pod slitting knife means which may be readily replaced when dulled and which is supported in a manner whereby the exposure of the knife edge from its supporting structure may be readily varied so as to enable the knife edge to cut through pea pods of different thicknesses.

A final object of this invention to be specifically enumerated herein is to provide a green pea sheller in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
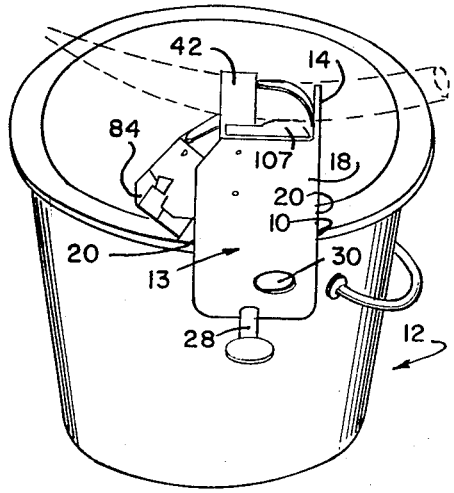
FIG. 1 is a perspective view of a conventional form of bucket with the green pea sheller of the instant invention clamped to one peripheral portion of the upper end of the bucket and a green pea pod illustrated in phantom lines being longitudinally advanced through the sheller from the left-hand side of the sheller.
Figure 2:
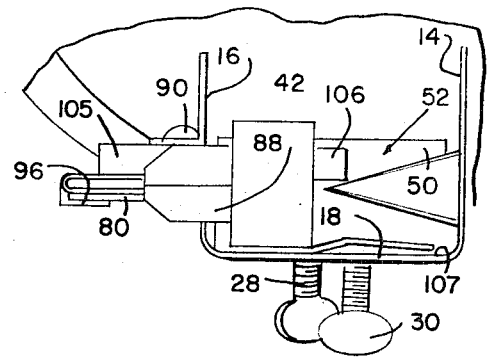
FIG. 2 is an enlarged fragmentary top plan view of the upper peripheral portion of the bucket to which the green pea sheller has been clamped.

Referring now more specifically to the drawings, the numeral 10 generally designates the green pea sheller of the instant invention. The sheller 10 is illustrated in FIGS. 1–3 and 5 as supported from a conventional form of pail or bucket referred to in general by the reference numeral 12 and the bucket 12 may provide the sole support for the sheller 10.

The sheller 10 includes an upright generally U-shaped body referred to in general by the reference numeral 13 and defining a pair of opposing generally parallel flanges 14 and 16 interconnected along adjacent upstanding edge portions by means of a bight portion 18. Each of the flanges 14 and 16 has a downwardly opening notch 20 formed therein and the lower end of the bight portion 18 includes an inwardly directed generally horizontal flange 22 through which a threaded bore 24 is formed. A second threaded bore 26 is formed through the bight portion 18 and a pair of thumb screws 28 and 30 are threaded through the bores 24 and 26. Screw 28 is abutted against the underside of the upper peripheral edge portion of the bucket or pail 12 and screw 30 is abutted against the upper side wall of the bucket 12 which is received in the aligned notches 20. In this manner, the sheller 10 is securely and removably fastened to the bucket or pail 12 in a manner which precludes inward or upward movement of the sheller 10.

An inverted J-shaped pod aligning member referred to in general by the reference numeral 32 comprises one member of a pair of members comprising a means for aligning pea pods to be slitted. The member 32 includes a first long upstanding leg 34 secured to the inner surface of the bight portion 18 by means of rivets 36 and 38. The pod aligning member 32 includes an arched portion 42 whereby a pea pod passing therethrough under upward pressure is automatically centered relative to the apex of the arch. The free edges of the arch portion 42 may be slightly rounded as at 62 to facilitate passage of a pea pod in and out of the aligning member 32.

A deflector plate assembly for deflecting shelled peas into the pail 12 is referred to in general by the reference numeral 44 and includes an upper flange portion 46 secured beneath the lower end of the leg 34 and to the inside of the bight portion 18 by means of the rivet 38. The deflector plate assembly 44 includes a lower downwardly and inwardly inclined flange portion 50 whose lower end is disposed inwardly of the inner extremities of the upper ends of the notches 20.

An inverted generally L-shaped hook referred to in general by the reference numeral 52 includes a lower upstanding leg 54 secured to the inner surface of the flange 14 by means of rivets 56 and 58 and the upper end of the leg 54 curves smoothly toward the flange 16 and terminates in a point 60 which is positioned a distance downwardly from the apex of the arch 42 so as to rake the peas out of the slitted pod without raking out a significant amount of pulp.

Figure 3:
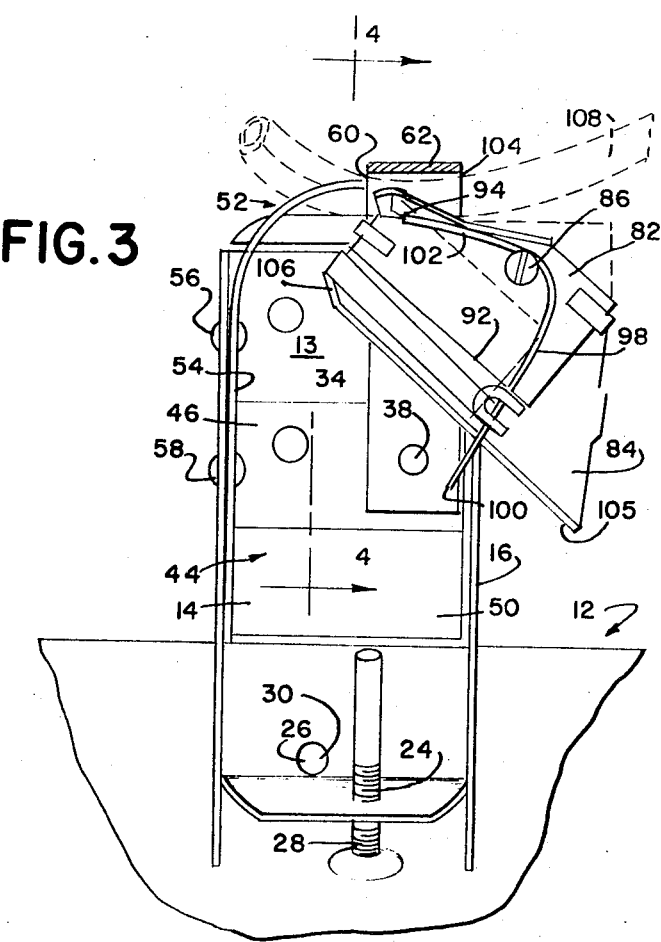
FIG. 3 is an enlarged fragmentary vertical sectional view taken substantially upon a plane passing through the center of the green pea sheller and disposed generally tangent to the adjacent upper peripheral lip portion of the bucket.
Figure 5:
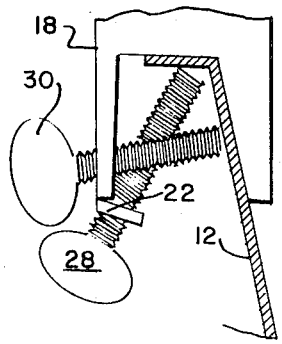
FIG. 5 is an enlarged fragmentary side elevational view of the lower portion of the sheller as seen from the left-hand side of FIG. 3.
Figure 4:
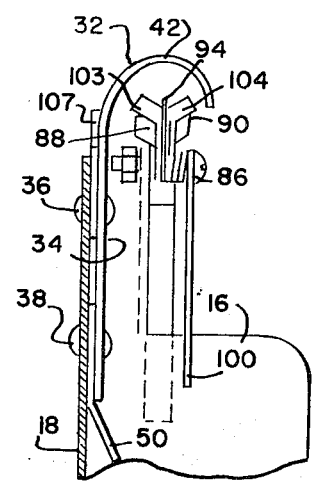
FIG. 4 is a fragmentary vertical sectional view taken substantially upon the plane indicated by the section line 4—4 of FIG. 3.

The flange 16 includes an outturned portion 80 to which a pair of superposed mounting plates 82 and 84 are secured by means of a pivot fastener 86. The mounting plates 82 and 84 include oppositely outwardly directed upper flange portions 88 and 90 which comprise the opposed member of the aforementioned means for aligning the pea pods to be slitted. The portions 88 and 90 are flared upwardly and form a trough having its low point vertically aligned with the apex of the arch 42. A conventional single edge razor blade 92 is clamped between the mounting plates 82 and 84, and thus is centered in the trough, and includes one corner portion 94 which projects upwardly between the rear ends of the flange portions 88 and 90. Flange portions 88 and 90 have rear end portions 103 and 104 which may be turned down so that in the event a slitted pod is not engaged by the rake 52 the pod can be pulled out. The mounting plate 84 includes a reversely bent portion 96 which embraces the forward edge of the outturned portion 80 and a butterfly spring 98 is encircled about the pivot fastener 86 and includes opposite end portions 100 and 102 engaged with the flange 16 and the flange portion 90, respectively, so as to urge the mounting plates 82 and 84 in clockwise directions to the limit positions thereof illustrated in solid lines in FIG. 3 of the drawings. The plates 82 and 84 are shown in phantom lines in FIG. 3 to depict the extreme counter-clockwise pivotal movement thereof against the bias of spring 98. The mounting plates 82 and 84 serve to frictionally support the single edge razor blade 92 therebetween and thus it will be appreciated that the razor blade 92 may be shifted slightly relative to the mounting plates 82 and 84 so as to vary the exposure of the corner portion 94. As seen best in FIGS. 2 and 3, mounting plate 84 has a turned-out flange portion 105. The end portion 106 of the flange 105 is slitted at the juncture with the plate 84 whereby the portion 106 can be bent up or down, as required, to raise or lower, respectively, the protrusion of the tip of the razor blade from between the plates within the trough defined by the flange portions 88 and 90. As also seen in FIG. 3, the plate 84 has a U-shaped hole 109 which leaves a portion 110 that can be bent up slightly to engage the end of razor blade 92 to hold the blade in place. Portion 110 can also be bent down slightly to remove the razor blade 92.

From the foregoing it will readily be seen that the arch portion 42 and spring biased trough defined by the flanges 88 and 90 define a means for aligning a pea pod in its travel past the corner portion 94 of the blade 92.

A person using the sheller 10 may be seated adjacent the bucket or pail 12 and successively snap off a pointed end of the pod 108, then lengthwise advance it into the forward end of the passage remote from point 60. As the pods 108 are pushed through the passage the corner portion 94 of the blade 92 will slit the convex edge of the pod 108 and the point 60 of the hook 52 will enter the opening made when the pointed end was snapped off and engage the peas therein so as to strip the latter from the pods 108 and direct the shelled peas downwardly through the body 13 for engagement with the flange portion 50 and the deflection into the bucket or pail 12. Therefore, it may be appreciated that peas may be shelled from the pods 108 as rapidly as the operator of the sheller 10 may snap off a pointed end and insert the pod 108 into the passage and thereafter pull the slit end of the pod 108 from within the passage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A shelling device comprising in combination, means for aligning a pod to be shelled relative to a pod slitting member, said aligning means comprising a pair of opposing generally concave members supported for relative movement toward and away from each other along a plane and biased toward minimum spaced positions, the opposing surfaces of said generally concave members defining an elongated passage, one of said concave members having a pod slitting member comprising a cutter blade projecting outwardly therefrom generally at the lowest point of the concavity defined by said one of said concave members, said cutter blade projecting toward the opposing member and extending generally longitudinally of said passage.

2. The combination of claim 1 wherein said cutter blade is supported from said one member for adjustable positioning relative thereto toward and away from the opposing generally concave member, whereby the exposure of said blade may be varied.

3. The combination of claim 2 wherein said cutter blade is inclined relative to the longitudinal axis of said passage with the one end thereof at one end of said passage disposed closer to the opposing anvil member.

4. The combination of claim 3 wherein said aligning members comprise a first relatively fixed arcuate member and a pivotally secured spring biased generally V-shaped member.

5. A green pea sheller including means defining an elongated passage for aligning a pea pod for presentation to a pod slitting member, said means for aligning a pod comprising a pair of opposing generally concave members supported for relative movement toward and away from each other along a plane, slitter knife means projecting outwardly from one of said opposing generally concave surfaces into said passage, said passage having an inlet and an outlet, and a curved stripper hook supported with its free end disposed at the outlet of said passage and facing toward the inlet, said slitter knife means being positioned at least slightly toward the inlet end of said passage from said free end of said stripper hook.

6. The combination of claim 3 wherein said slitter knife means is adjustably supported for adjusting the exposure of said slitter knife means.

7. The combination of claim 5 wherein said sheller includes support means for removably embracingly and clampingly engaging the underside of the upper rim and outside of the side wall of an open top container for support of said sheller therefrom.

8. The combination of claim 7 wherein said support means is adapted to support said sheller from said container with said passage horizontally disposed and elevated above said container, said sheller also including deflector means operative to deflect peas falling from said stripper hook inwardly toward the center of the container upon which said sheller is mounted.

9. The combination of claim 5 including an upstanding generally channel-shaped body from whose upper end portion said first means is supported, said body including a pair of generally parallel upstanding flanges interconnected by means of a bight portion extending between corresponding marginal portions thereof, said flanges including aligned downwardly opening recesses formed in their lower marginal portions, said notches being adapted to upwardly receive therein circumferentially spaced upper rim portions of a bucket or pail.

10. The combination of claim 9 wherein said slitter knife means includes a detent for precluding shifting of said slitter knife toward the inlet of said passage.

* * * * *